(12) United States Patent
Inada

(10) Patent No.: US 12,309,308 B2
(45) Date of Patent: May 20, 2025

(54) COMMUNICATION SYSTEM, VOICE INPUT DEVICE, COMMUNICATION TERMINAL, AND PROGRAM

(71) Applicant: ICOM INCORPORATED, Osaka (JP)

(72) Inventor: Tatsuhiro Inada, Osaka (JP)

(73) Assignee: ICOM INCORPORATED, Osaka (JP)

( * ) Notice: Subject to any disclaimer, the term of this patent is extended or adjusted under 35 U.S.C. 154(b) by 71 days.

(21) Appl. No.: 17/927,117

(22) PCT Filed: Dec. 10, 2021

(86) PCT No.: PCT/JP2021/045440
§ 371 (c)(1),
(2) Date: Nov. 22, 2022

(87) PCT Pub. No.: WO2022/168438
PCT Pub. Date: Aug. 11, 2022

(65) Prior Publication Data
US 2023/0412719 A1    Dec. 21, 2023

(30) Foreign Application Priority Data
Feb. 5, 2021  (JP) ................................. 2021-017680

(51) Int. Cl.
*H04M 1/72409*    (2021.01)
*G06F 3/16*    (2006.01)
(Continued)

(52) U.S. Cl.
CPC ........ *H04M 1/72409* (2021.01); *G06F 3/162* (2013.01); *H04M 1/6008* (2013.01); *H04R 3/04* (2013.01)

(58) Field of Classification Search
CPC ........... H04M 1/72409; H04M 1/6008; H04M 1/2535; G06F 3/162
See application file for complete search history.

(56) References Cited

U.S. PATENT DOCUMENTS

2001/0046887 A1   11/2001  Yamaoka
2006/0019689 A1   1/2006   Pantalone et al.
(Continued)

FOREIGN PATENT DOCUMENTS

CN   102740215 A      10/2012
CN   102881287 A  *   1/2013
(Continued)

OTHER PUBLICATIONS

International Search Report and Written Opinion for Application No. PCT/JP2021/045440, dated Mar. 8, 2022, 9 pages.
(Continued)

*Primary Examiner* — Angelica Perez
(74) *Attorney, Agent, or Firm* — McCarter & English, LLP

(57) ABSTRACT

Provided is a communication system that enables smooth wireless communication. A communication system (1) includes a communication terminal (20) and a microphone (10) connected to each other. The microphone includes a microphone element (11) which converts a voice to an electric signal and a PTT switch (12) which switches between transmitting or not transmitting the electric signal to the communication terminal. The communication terminal includes a VOX determination section (232) and an operation sound determination section (233), each of which determines a level of the electric signal, and a transmission control section (234) which controls transmission of the electric signal in accordance with the level.

13 Claims, 4 Drawing Sheets

(51) Int. Cl.
    *H04M 1/60*     (2006.01)
    *H04R 3/04*     (2006.01)

(56) References Cited

U.S. PATENT DOCUMENTS

| | | |
|---|---|---|
| 2009/0227298 A1 | 9/2009 | Fukunaga |
| 2012/0253796 A1 | 10/2012 | Majima |
| 2012/0294454 A1 | 11/2012 | Sakamoto et al. |

FOREIGN PATENT DOCUMENTS

| | | | |
|---|---|---|---|
| JP | 2002-033791 A | | 1/2002 |
| JP | 2004-80596 A | | 3/2004 |
| JP | 2005-217695 A | | 8/2005 |
| JP | 4526571 B2 | | 8/2010 |
| JP | 2012-99999 A | | 5/2012 |
| JP | 2012099999 A | * | 5/2012 |
| JP | 2013-066149 A | | 4/2013 |
| JP | 2014-239422 A | | 12/2014 |
| JP | 2015-91120 A | | 5/2015 |
| JP | 2015091120 A | * | 5/2015 |
| JP | 2018-74487 A | | 5/2018 |

OTHER PUBLICATIONS

Chinese Office Action for Application No. 202180046252.6, dated Jan. 21, 2024, 19 pages (with English translation).
English Translation of Written Opinion of the International Searching Authority in International Application No. PCT/JP2021/045440 mailed Mar. 8, 2022 (5 pages).
European Office Action for Application No. 21924823.4, dated Jun. 12, 2024, 8 pages.

\* cited by examiner

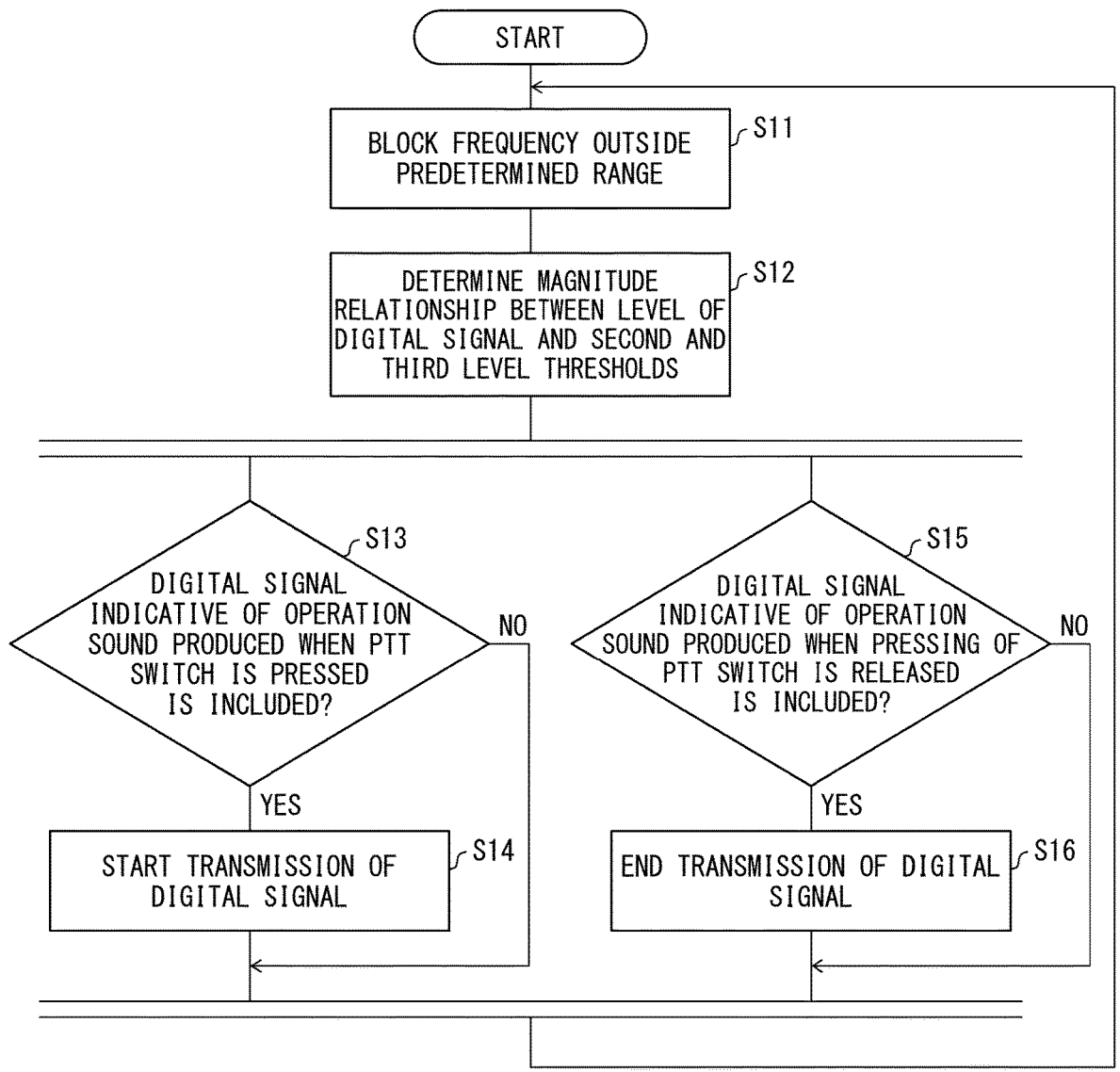

COMMUNICATION SYSTEM, VOICE INPUT DEVICE, COMMUNICATION TERMINAL, AND PROGRAM

CROSS-REFERENCE TO RELATED APPLICATIONS

This application is a 35 U.S.C. § 371 national stage filing of International Application No. PCT/JP2021/045440, filed on Dec. 10, 2021, which in turn claims priority to Japanese Patent Application No. 2021-017680, filed Feb. 5, 2021. The entire contents of each of the foregoing applications are included herein by reference in their entirety.

TECHNICAL FIELD

The present invention relates to: a communication system in which a microphone and a communication terminal are connected to each other; the microphone and the communication terminal included in the communication system; and a program.

BACKGROUND ART

There has been an Internet Protocol (IP) transceiver application which is installed on a smartphone or the like and used. When this application is used, a voice is transmitted only in a case where a user speaks. As such, the user needs to carry out an operation for transmission. In a case where a small external microphone is connected to the smartphone via a phone connector, the operation for transmission cannot be inputted via the phone connector, and thus the operation for transmission cannot be carried out with use of the external microphone.

A function known as "Voice Operated Xmit (VOX) function", in which transmission is carried out only in a case where a voice has been inputted, can be used as a solution to the above problem. However, use of the VOX function has the following problems: even in a case where the user has not inputted a voice, transmission may be carried out due to ambient noise; and even in a case where the user has inputted a voice, transmission may not be carried out if the voice of the user is too quiet.

CITATION LIST

Patent Literature

Patent Literature 1

Japanese Patent Application Publication Tokukai No. 2014-239422

Patent Literature 2

Japanese Patent No. 4526571

SUMMARY OF INVENTION

Technical Problem

Patent Literature 1 discloses a calling device which includes a Push To Talk (PTT) button and a microphone switch circuit that transmits a microphone audio signal only while the PTT button is being pressed. However, the calling device requires connecting a communication terminal and a microphone to each other via a connecting device instead of directly connecting the communication terminal and the microphone to each other.

It is an object of an aspect of the present invention to provide a communication system and the like enabling smooth wireless communication in accordance with an operation carried out on a voice input device in a state where a communication terminal and the voice input device are connected to each other.

Solution to Problem

In order to attain the object, a communication system in accordance with an aspect of the present invention is a communication system, including: a communication terminal capable of communicating with an Internet Protocol (IP) transceiver; and a voice input device for inputting a voice into the communication terminal, the communication terminal and the voice input device being connected to each other via a phone connector, the IP transceiver being configured to carry out communication over a mobile phone network, the voice input device including: a microphone element configured to convert the voice into an electric signal; a transmission switch configured to switch between transmitting or not transmitting the electric signal from the voice input device to the communication terminal; and a connection state maintenance circuit for causing the communication terminal to recognize, regardless of a state of the transmission switch, that a connection between the voice input device and the communication terminal is maintained, the communication terminal including: a connection detection section configured to detect a state in which the voice input device and the communication terminal are connected to each other; a level determination section configured to determine a level of the electric signal in a state in which the voice input device is connected to the communication terminal; and a transmission control section configured to control, in accordance with a result of determination by the level determination section, transmission of the electric signal to the IP transceiver.

A communication terminal in accordance with each aspect of the present invention can be realized by a computer. The computer is operated based on (i) a program for causing the computer to realize the communication terminal by causing the computer to operate as each section (software element) included in the communication terminal and (ii) a computer-readable storage medium in which the program is stored. Such a control program and a computer-readable storage medium are included in the scope of the present invention.

Advantageous Effects of Invention

According to an aspect of the present invention, it is possible to provide a communication system and the like enabling smooth wireless communication in accordance with an operation carried out on a voice input device in a case where a communication terminal and the voice input device are connected to each other.

BRIEF DESCRIPTION OF DRAWINGS

FIG. 4 is a flowchart illustrating a process carried out by a control section of a communication terminal included in the communication system in accordance with Embodiment 2.

DESCRIPTION OF EMBODIMENTS

Embodiment 1

The following description will discuss an embodiment of the present invention in detail.

Figure 1:
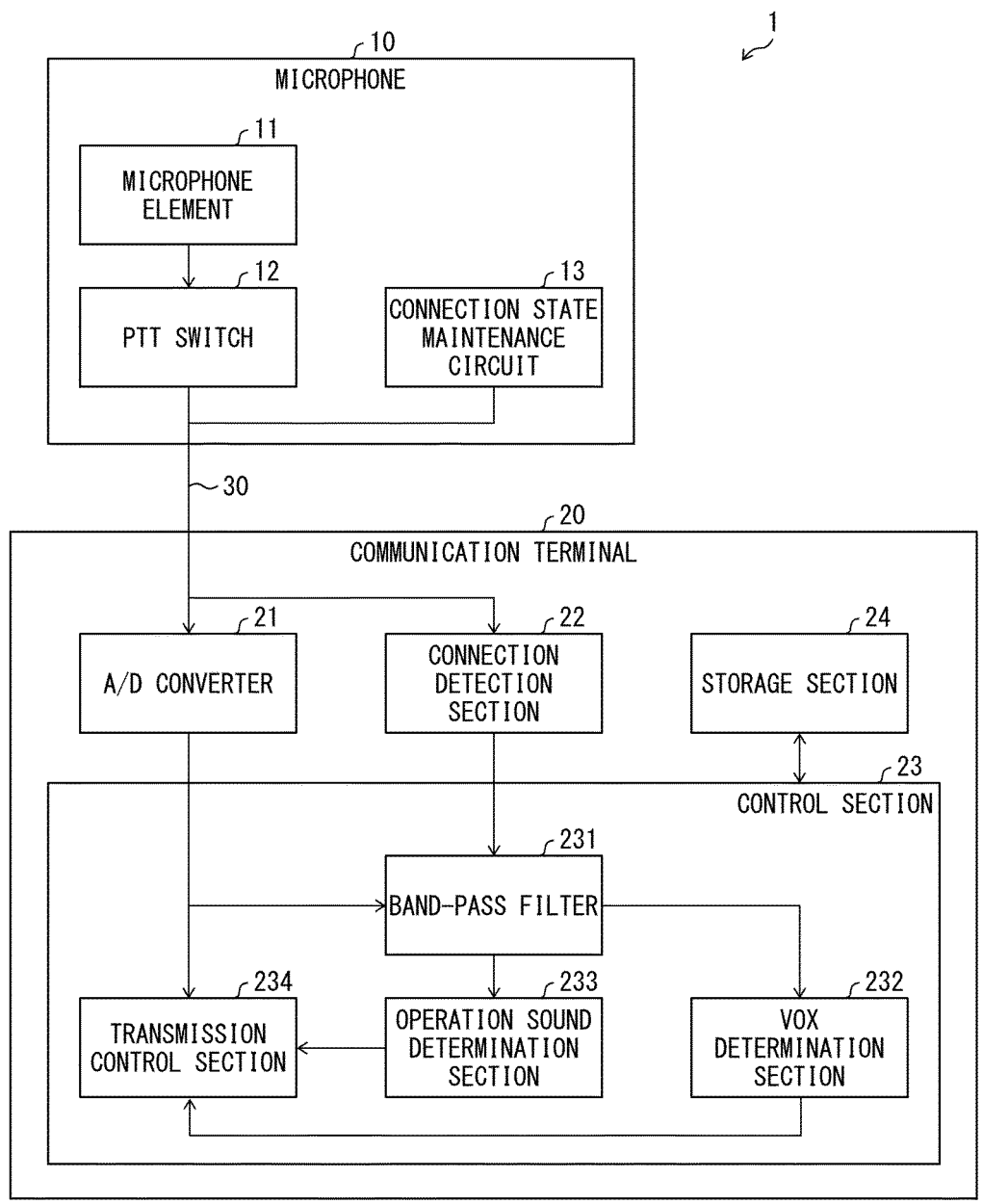
FIG. 1 is a block diagram illustrating a configuration of a main part of a communication system in accordance with Embodiment 1.

FIG. 1 is a block diagram illustrating a configuration of a main part of a communication system 1 in accordance with Embodiment 1. As illustrated in FIG. 1, the communication system 1 includes a microphone 10 (voice input device) and a communication terminal 20. The microphone 10 and the communication terminal 20 are connected to each other via a phone connector 30.

Configuration of Microphone 10

The microphone 10 is a device that allows a user of the communication system 1 to input a voice into the communication terminal 20. The microphone 10 includes a microphone element 11, a PTT switch 12 (transmission switch), and a connection state maintenance circuit 13.

The microphone element 11 is an element that converts a voice inputted by the user into an analogue signal. The microphone element 11 is not limited to a particular one, and can be a publicly-known microphone element.

The PTT switch 12 is a switch that switches between transmitting or not transmitting, from the microphone 10 to the communication terminal 20, the analogue signal converted by the microphone element 11. For example, the PTT switch 12 is configured such that, only in a case where the PTT switch 12 is being pressed, the microphone element 11 and the communication terminal 20 are electrically connected to each other so that the analogue signal converted by the microphone element 11 is transmitted to the communication terminal 20.

The connection state maintenance circuit 13 is a circuit for causing the communication terminal 20 to recognize, regardless of a state of the PTT switch 12, that a connection between the microphone 10 and the communication terminal 20 is maintained. Since the microphone 10 includes the connection state maintenance circuit 13, the communication terminal 20 can recognize that the microphone 10 is connected, even in a state where the PTT switch 12 is not being pressed, i.e., a state where the microphone element 11 and the communication terminal 20 are not electrically connected to each other.

Specific examples of the connection state maintenance circuit 13 include a resistive element provided in parallel to the microphone element 11. A resistance of the resistive element only needs to be sufficiently higher than a resistance of the microphone element 11, and is, for example, 10 kΩ. Use of such a resistive element as the connection state maintenance circuit 13 allows the communication terminal to recognize that the microphone 10 is connected, even in a case where the PTT switch 12 is not being pressed. In a case where the PTT switch 12 has been pressed, almost no electric current passes through the connection state maintenance circuit 13, so that an operation of the microphone element 11 is not inhibited.

Configuration of Communication Terminal 20

The communication terminal 20 is a terminal capable of communicating with an IP transceiver which carries out communication over a mobile phone network. The IP transceiver can be a dedicated device used as an IP transceiver, or can be a communication terminal in which an application that provides an IP transceiver function has been installed. Examples of the communication terminal 20 include a smartphone. The communication terminal 20 includes an analog/digital (A/D) converter 21, a connection detection section 22, a control section 23, and a storage section 24. The communication terminal 20 also includes constituent components typically included in a communication terminal, such as a built-in microphone for inputting a voice into the communication terminal 20, a built-in speaker for voice output from the communication terminal 20, and an antenna for external communication.

The A/D converter 21 converts an analogue signal inputted from the microphone element 11 into a digital signal (electric signal) and inputs the digital signal into the control section 23. The A/D converter 21 is not limited to a particular one, and can be a publicly-known A/D converter. The connection detection section 22 detects a state in which the microphone 10 and the communication terminal 20 are connected to each other. Specifically, the connection detection section 22 measures a voltage between terminals of a plug (not illustrated) included in the phone connector 30, and outputs, to the control section 23 and in accordance with the voltage, a signal indicative of whether the microphone 10 is connected. That is, the connection detection section 22 functions both as hardware to measure a voltage and as software to determine, in accordance with the voltage thus measured, whether the microphone 10 is connected.

As described above, the microphone 10 includes the connection state maintenance circuit 13. As such, in a case where the microphone 10 is connected to the communication terminal 20, a voltage between the connection terminals is, regardless of a state of the PTT switch 12, always at a level in a case where the microphone 10 is connected. Accordingly, the connection detection section 22 outputs, to the control section 23, a signal indicating that the microphone 10 is connected.

In a case where the microphone 10 does not include the connection state maintenance circuit 13, the connection detection section 22 alternately outputs, in accordance with a user's operation of the PTT switch 12, a signal indicating that the microphone 10 is connected and a signal indicating that the microphone 10 is not connected. In this case, there is a time lag between a point in time where the user presses the PTT switch 12 and a point in time where the signal indicating that the microphone 10 is connected is subsequently outputted by the connection detection section 22 so that a signal can be transmitted from the microphone 10 to the communication terminal 20. This is problematic for communication.

The control section 23 controls an operation of the communication terminal 20. The control section 23 includes a band-pass filter 231, a VOX determination section 232 (level determination section), an operation sound determination section 233 (level determination section), and a transmission control section 234.

The band-pass filter 231 allows only a digital signal included in an inputted digital signal and having a frequency within a predetermined range to pass through. In other words, the band-pass filter 231 carries out a process of blocking a digital signal having a frequency outside the predetermined range. The predetermined range is, for example, a voice frequency range used in wireless communication. The predetermined range is, for example, but not limited to, 0.3 kHz to 3.4 kHz, which is a typical voice frequency band used in a telephone call.

In a case where a signal indicating that the microphone 10 is connected to the communication terminal 20 has been inputted from the connection detection section 22, the band-pass filter 231 carries out the above process on a digital signal inputted from the A/D converter 21. In a case where a signal indicating that the microphone 10 is not connected to the communication terminal 20 has been inputted from the connection detection section 22, the band-pass filter 231 carries out the above process on a digital signal inputted from another voice input device (for example, the built-in microphone of the communication terminal 20).

The VOX determination section 232 determines whether a level of the digital signal that has passed through the band-pass filter 231 is not less than a predetermined first level threshold. The first level threshold in Embodiment 1 is, for example, a lower limit of a level of a digital signal that has been converted from a quiet voice that is assumed to be inputted into the microphone element 11 by the user. The first level threshold can be changed by the user's operation of the communication terminal 20.

The operation sound determination section 233 determines whether the digital signal that has passed through the band-pass filter 231 is at a level (i) less than a predetermined second level threshold, (ii) not less than a predetermined third level threshold, which is higher than the second level threshold, or (iii) not less than the second level threshold and less than the third level threshold. The definitions of the second level threshold and the third level threshold will be described later.

In the microphone 10, operating the PTT switch 12 causes the microphone element 11 to be switch between connected and disconnected, so that a signal of a loud noise (hereinafter referred to as "operation sound") is outputted to the communication terminal 20. In general, a change in level of a digital signal resulting from a change in volume of inputted voice is approximately several millivolts. In contrast, a change in level of a digital signal resulting from an operation sound is approximately several volts, which is approximately 1000 times the change in a digital signal due to a change in volume of inputted voice. In a case where such a digital signal indicative of an operation sound is transmitted from the communication terminal 20 to an IP transceiver or the like of a communication partner, the operation sound may be outputted from the IP transceiver or the like of the communication partner to give discomfort to a user who is the communication partner.

The second level threshold is a threshold for determining whether a digital signal indicates silence. A digital signal at a level less than the second level threshold is considered to indicate silence. The third level threshold is a threshold for determining whether a digital signal indicates an operation sound. A digital signal at a level not less than the third level threshold is considered to indicate an operation sound. A digital signal at a level not less than the second level threshold but less than the third level threshold is considered to indicate a voice inputted by the user. The second level threshold and the third level threshold can each be changed by the user's operation of the communication terminal 20. The second level threshold can be equal to the first level threshold.

In the following description, a period in which the operation sound determination section 233 determines that a digital signal is at a level less than the second level threshold is referred to as a first period. A period in which the operation sound determination section 233 determines that a digital signal is at a level not less than the third level threshold is referred to as a second period. A period in which the operation sound determination section 233 determines that a digital signal is at a level not less than the second level threshold but less than the third level threshold is referred to as a third period.

The transmission control section 234 controls, in accordance with a result of determination by the VOX determination section 232 and a result of determination by the operation sound determination section 233, transmission of a digital signal to an IP transceiver or the like of a communication partner. Specifically, the transmission control section 234 transmits, to an IP transceiver or the like of a communication partner, a digital signal that is at a level determined by the VOX determination section 232 to be not less than the first level threshold. That is, the transmission control section 234 provides a function known as VOX function in which, only in a case where an inputted voice is at a volume not lower than a certain level, a digital signal indicative of that voice is transmitted to an IP transceiver or the like of a communication partner.

The first level threshold corresponds to a sensitivity of the VOX function. The sensitivity of the VOX function increases as the first level threshold decreases. The sensitivity of the VOX function decreases as the first level threshold increases. In a case where the sensitivity of the VOX function is high, even a quiet input voice can be transmitted, but ambient noise is more likely to be transmitted. In a case where the sensitivity of the VOX function is low, ambient noise is less likely to be transmitted, but a quiet input voice is not transmitted.

In the communication system 1, a digital signal indicative of an input voice is transmitted to the communication terminal 20 only in a case where the PTT switch 12 is being pressed. As such, the first level threshold for the VOX determination section 232 can be set to a sufficiently low value because it is not necessary to take account of ambient noise when the user is not inputting voice. Setting the first level threshold in this manner allows even a signal indicative of a relatively quiet input voice to be transmitted to an IP transceiver or the like of a communication partner. This makes it possible to provide operability substantially equal to that of a PTT function in an ordinarily transceiver.

In a case where a digital signal has a first period, a second period, and a third period in this order, the transmission control section 234 stops transmission of the digital signal during a period until an end of the second period. In a case where a digital signal has a third period, a second period, and a first period in this order, the transmission control section 234 stops transmission of the digital signal during a period after a start of the second period. In the cases where a digital signal has a first period, a second period, and a third period in this order or in reverse order, the digital signal during the second period is considered to indicate an operation sound. In these cases, the transmission control section 234 controls the digital signal in the second period to not be transmitted to an IP transceiver or the like of a communication partner, and thus enables prevention of transmission of a digital signal indicative of an operation sound.

As described above, the VOX determination section 232 and the operation sound determination section 233 each determine a level of a digital signal that has passed through the band-pass filter 231. This allows reducing an effect of noise in determination of a level of a digital signal. The effect of noise will be described later. The transmission control section 234 transmits, to an IP transceiver or the like of a communication partner, a digital signal which has not passed through the band-pass filter 231. A digital signal that has passed through the band-pass filter 231 is degraded also with respect to a component having a frequency within a predetermined range. The transmission control section 234 controls transmission of a digital signal which has not passed through the band-pass filter 231, i.e., a digital signal inputted from the A/D converter 21. Thus, the communication system 1 transmits an undegraded digital signal to an IP transceiver or the like of a communication partner, and thus enables an improvement in communication quality.

The storage section 24 stores therein information necessary for control carried out by the control section 23. The storage section 24 temporarily stores therein, for example, a digital signal that has been processed by the A/D converter 21. The VOX determination section 232 and the operation sound determination section 233 carry out the above-described determinations with respect to a digital signal stored in the storage section 24.

Processing Carried Out by Communication Terminal 20

Figure 2:
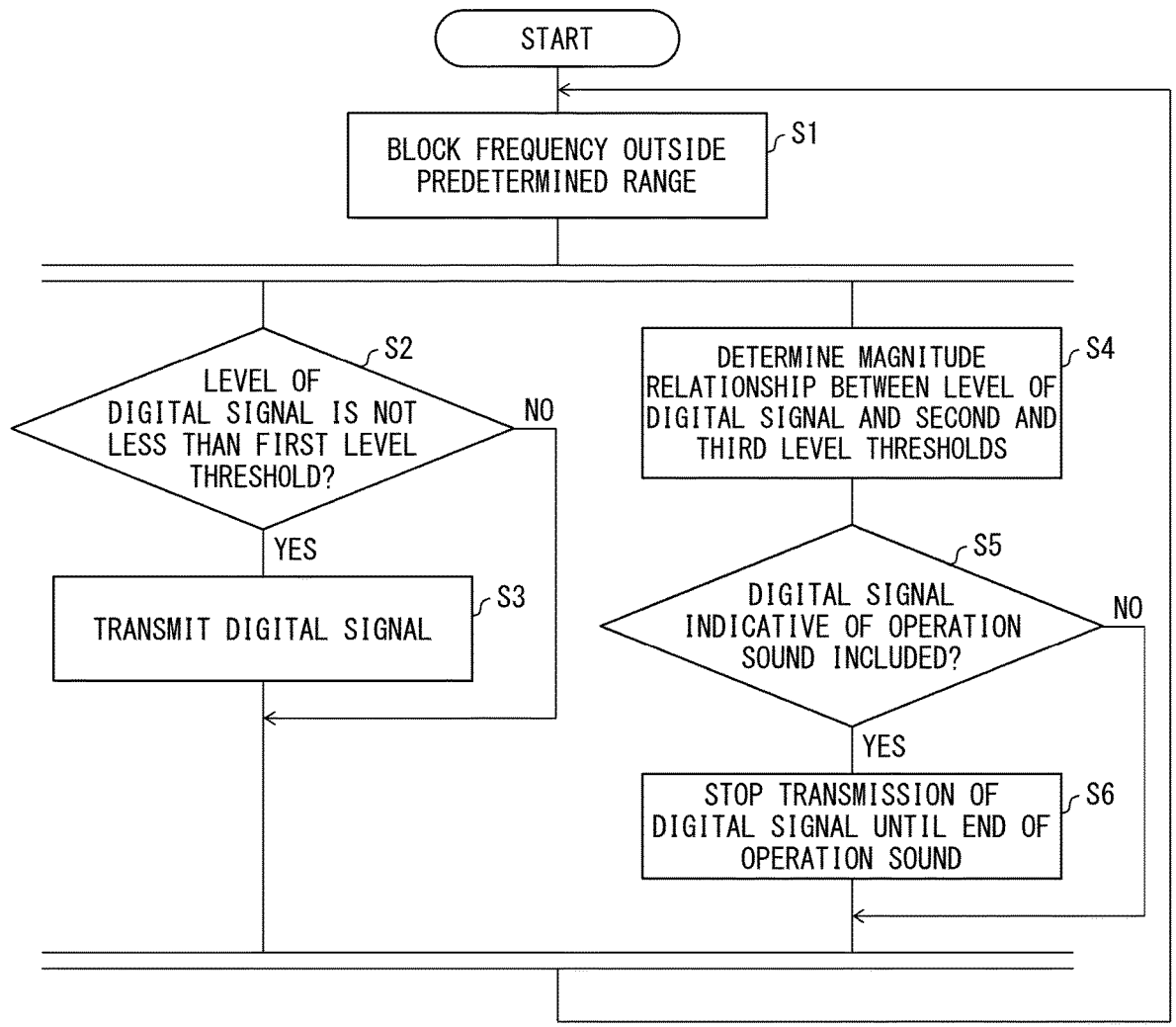
FIG. 2 is a flowchart illustrating a process carried out by a control section of a communication terminal included in the communication system in accordance with Embodiment 1.

FIG. 2 is a flowchart illustrating a process carried out by the control section 23. The process illustrated in FIG. 2 is a process carried out in a state where the microphone 10 is connected to the communication terminal 20. As illustrated in FIG. 2, in a state where the microphone 10 is connected to the communication terminal 20, firstly, the band-pass filter 231 blocks a digital signal that is included in a digital signal inputted from the A/D converter 21 and that has a frequency outside a predetermined range (S1).

The VOX determination section 232 determines whether a digital signal that has passed through the band-pass filter 231 is at a level not less than the first level (S2). In a case where the digital signal is at a level not less than the first level (YES in S2), the transmission control section 234 transmits the digital signal to an IP transceiver or the like of a communication partner (S3). In a case where the level of the digital signal is less than the first level (NO in S2), the transmission control section 234 skips Step S3. That is, the transmission control section 234 does not transmit the digital signal to an IP transceiver or the like of a communication partner.

The operation sound determination section 233 determines a magnitude relationship between the level of the digital signal that has passed through the band-pass filter 231 and each of the second level threshold and the third level threshold (S4). The transmission control section 234 determines, in accordance with a result of determination by the operation sound determination section 233, whether the digital signal that has passed through the band-pass filter 231 includes a digital signal indicative of an operation sound (S5). In a case where the digital signal that has passed through the band-pass filter 231 includes a digital signal indicative of an operation sound (YES in S5), the transmission control section 234 stops transmission of the digital signal during the second period (S6). In a case where the digital signal that has passed through the band-pass filter 231 does not include a digital signal indicative of an operation sound (NO in S5), the transmission control section 234 skips Step S6.

The control section 23 carries out the processes in steps S2 and S3 in parallel with the processes in steps S4 through S6. When a series of these processes is finished, the control section 23 repeats the processes from Step S1.

As described above, in the communication system 1, the transmission control section 234 controls, in accordance with a result of determination of a level with respect to a digital signal, transmission of the digital signal to an IP transceiver or the like of a communication partner. As described above, the sensitivity of the VOX function can be set high in the communication system 1. As such, even in a case where a voice inputted into the microphone 10 is quiet, the communication terminal can transmit a digital signal indicative of the voice to an IP transceiver or the like of a communication partner. Further, the communication terminal 20 recognizes, regardless of a state of the PTT switch 12, that a connection between the microphone 10 and the communication terminal 20 is maintained. As such, the communication terminal 20 can receive input of a voice as soon as the PTT switch 12 is pressed. Thus, the communication system 1 enables smooth wireless communication to be carried out by the user's operation of the microphone 10.

Further, in the communication system 1, the microphone 10 and the communication terminal 20 are connected to each other via the phone connector 30. As such, a simplified microphone configuration is achieved in comparison to, for example, a case in which a microphone and a communication terminal are connected to each other via a universal serial bus (USB). Further, in comparison to, for example, a case in which a microphone and a communication terminal are connected to each other via Bluetooth (Registered trademark), a simplified microphone configuration is achieved and also a power supply for the microphone becomes unnecessary.

Further, in the communication system 1, the user can simply operate the PTT switch 12 included in the microphone 10. As such, in comparison to, for example, a case in which a PTT switch provided on a touch panel of the communication terminal 20 is operated, convenience is improved due to a lack of need to look at a touch panel when carrying out the operation.

Note that the control section 23 does not necessarily have to include the band-pass filter 231. In that case, the VOX determination section 232 and the operation sound determination section 233 each determine a level of a digital signal inputted from the A/D converter 21. Also with this configuration, wireless communication can be carried out by the microphone 10 and the communication terminal 20.

However, in a case where the control section 23 does not include the band-pass filter 231, a digital signal may be transmitted to an IP transceiver or the like of a communication partner due to an effect of noise. Typically, a digital signal resulting from noise is, in itself, silence. However, an IP transceiver generally has a function of, in a case where a signal has been externally received, notifying a user of that fact. For example, in a case where the IP transceiver includes a display, the display indicates that the signal has been received. As such, a user of an IP transceiver or the like, who is a communication partner and has received a digital signal resulting from noise, waits based on the misunderstanding that the user of the communication terminal 20 is trying to transmit a voice. This can inhibit a smooth conversation. As such, the control section 23 preferably includes the band-pass filter 231.

Further, the control section 23 does not necessarily have to include the operation sound determination section 233. However, in a case where the control section 23 does not include the operation sound determination section 233, a digital signal indicative of an operation sound is transmitted to an IP transceiver or the like of a communication partner, so that the communication partner may experience discomfort. As such, the control section 23 preferably includes the operation sound determination section 233.

Embodiment 2

The following description will discuss another embodiment of the present invention. For convenience, identical reference numerals will be given to members which have respective functions identical with those described in the above embodiment, and descriptions of the respective members will not be repeated.

Figure 3:
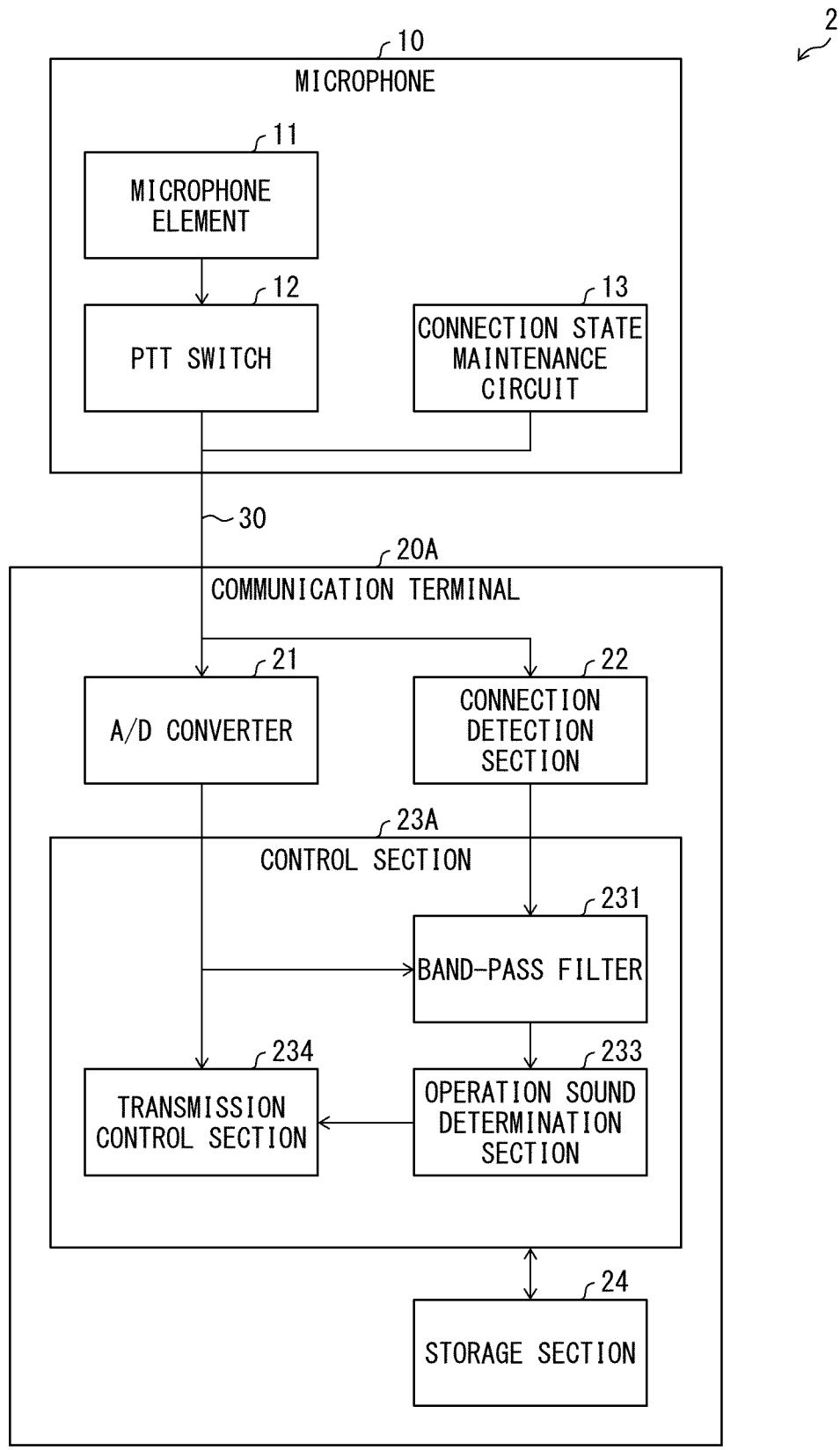
FIG. 3 is a block diagram illustrating a configuration of a main part of a communication system in accordance with Embodiment 2.

FIG. 3 is a block diagram illustrating a configuration of a main part of a communication system 2 in accordance with Embodiment 2. As illustrated in FIG. 3, the communication system 2 differs from the communication system 1 by including a communication terminal 20A in place of the communication terminal 20. The communication terminal 20A differs from the communication terminal 20 by including a control section 23A in place of the control section 23. The control section 23A differs from the control section 23 by not including the VOX determination section 232.

In a case where a digital signal has a first period, a second period, and a third period in this order, a transmission control section 234 in the control section 23A starts, in response to an end of the second period, transmission of the digital signal to an IP transceiver or the like of a communication partner. In a case where a digital signal has a third period, a second period, and a first period in this order, the transmission control section 234 ends, in response to a start of the second period, transmission of the digital signal to an IP transceiver or the like of a communication partner.

An operation sound includes an operation sound that is produced when a PTT switch 12 is pressed and an operation sound that is produced when pressing of the PTT switch 12 is released. In a case where a digital signal has a first period, a second period, and a third period, it is possible to make a distinction as to which one of these operation sounds is indicated by the digital signal, depending on an order of the first period, the second period, and the third period. Specifically, in a case where a digital signal has a first period, a second period, and a third period in this order, the digital signal indicates an operation sound that is produced when the PTT switch 12 is pressed. In a case where a digital signal has a third period, a second period, and a first period in this order, the digital signal indicates an operation sound that is produced when pressing of the PTT switch 12 is released.

In a case where a digital signal indicates an operation sound that is produced when the PTT switch 12 is pressed, a previous digital signal is considered to indicate silence and a subsequent digital signal is considered to indicate a voice inputted by the user. In a case where a digital signal indicates an operation sound that is produced when pressing of the PTT switch 12 is released, a previous digital signal is considered to indicate a voice inputted by the user and a subsequent digital signal is considered to indicate silence. In the control section 23A, the transmission control section 234 controls a start and an end of digital signal transmission to an IP transceiver or the like of a communication partner, in response to input of a digital signal indicative of an operation sound.

FIG. 4 is a flowchart illustrating a process carried out by the control section 23A. The process illustrated in FIG. 4 is a process carried out in a state where a microphone 10 is connected to the communication terminal 20, as in the process illustrated in FIG. 2. In the process carried out by the control section 23A, as in the process carried out by the control section 23, firstly, a band-pass filter 231 blocks a digital signal that is included in a digital signal inputted from an A/D converter 21 and that has a frequency outside a predetermined range (S11). An operation sound determination section 233 determines a magnitude relationship between a level of a digital signal that has passed through the band-pass filter 231 and each of the second level threshold and the third level threshold (S12).

The transmission control section 234 determines, in accordance with a result of determination by the operation sound determination section 233, whether the digital signal that has passed through the band-pass filter 231 includes a digital signal indicative of an operation sound that is produced when the PTT switch 12 is pressed (S13). In a case where the digital signal that has passed through the band-pass filter 231 includes a digital signal indicative of an operation sound that is produced when the PTT switch 12 is pressed (YES in S13), the transmission control section 234 starts transmission of the digital signal after an end of the second period (S14). In a case where the digital signal that has passed through the band-pass filter 231 does not include a digital signal indicative of an operation sound that is produced when the PTT switch 12 is pressed (NO in S13), the transmission control section 234 skips Step S14.

Further, the transmission control section 234 determines whether the digital signal that has passed through the band-pass filter 231 includes a digital signal indicative of an operation sound that is produced when pressing of the PTT switch 12 is released (S15). In a case where the digital signal that has passed through the band-pass filter 231 includes a digital signal indicative of an operation sound that is produced when pressing of the PTT switch 12 is released (YES in S15), the transmission control section 234 ends transmission of the digital signal before a start of the second period (S16). In a case where the digital signal that has passed through the band-pass filter 231 does not include a digital signal indicative of an operation sound that is produced when pressing of the PTT switch 12 is released (NO in S15), the transmission control section 234 skips Step S16.

In the flowchart illustrated in FIG. 4, the transmission control section 234 carries out the processes in steps S13 and S14 in parallel with the processes in steps S15 and S16. However, the transmission control section 234 can be configured to carry out only the processes in Steps S13 and S14 in a case where digital signal transmission is not being carried out and to carry out only the processes in Steps S15 and S16 in a case where digital signal transmission is being carried out. When a series of these processes is finished, the control section 23A repeats the processes from Step S11.

As described above, in the communication system 2, the transmission control section 234 controls, in accordance with a result of determination by the operation sound determination section 233, a start and an end of digital signal transmission to an IP transceiver or the like of a communication partner. This communication system 2, too, prevents transmission of a digital signal indicative of an operation sound and enables smooth wireless communication.

Software Implementation Example

Functions of the communication terminals 20, 20A (hereinafter referred to as a "device") can be realized by a program for causing a computer to function as the device, the program causing the computer to function as control blocks (in particular, sections included in the control sections 23, 23A) of the device.

In this case, the device includes, as hardware for executing the program, a computer that includes at least one control device (for example, a processor) and at least one storage device (for example, a memory). The functions described in the above embodiments are realized by executing the program with use of the control device and the storage device.

The program can be stored in one or more non-transitory, computer-readable storage media. The one or more storage media can be included in the device or can be not included in the device. In the latter case, the program can be made available to the device via any wired or wireless transmission medium.

Further, part or all of the functions of the control blocks can also be realized by a logic circuit. For example, an integrated circuit in which a logic circuit functioning as the control blocks is formed is included in the scope of the present invention. Apart from the above, for example, the functions of the control blocks can also be realized by a quantum computer.

Aspects of the present invention can also be expressed as follows:

A communication system in accordance with Aspect 1 of the present invention is a communication system, including: a communication terminal capable of communicating with an Internet Protocol (IP) transceiver; and a voice input device for inputting a voice into the communication terminal, the communication terminal and the voice input device being connected to each other via a phone connector, the IP transceiver being configured to carry out communication over a mobile phone network, the voice input device including: a microphone element configured to convert the voice into an electric signal; a transmission switch configured to switch between transmitting or not transmitting the electric signal from the voice input device to the communication terminal; and a connection state maintenance circuit for causing the communication terminal to recognize, regardless of a state of the transmission switch, that a connection between the voice input device and the communication terminal is maintained, the communication terminal including: a connection detection section configured to detect a state in which the voice input device and the communication terminal are connected to each other; a level determination section configured to determine a level of the electric signal in a state in which the voice input device is connected to the communication terminal; and a transmission control section configured to control, in accordance with a result of determination by the level determination section, transmission of the electric signal to the IP transceiver.

According to the above configuration, the transmission control section controls, in accordance with a result of determination of a level with respect to an electric signal, transmission of the electric signal to an IP transceiver or the like of a communication partner. At this time, the electric signal from the voice input device is transmitted to the communication terminal only in a case where the transmission switch is being pressed. The communication terminal recognizes, regardless of a state of the transmission switch, that a connection between the voice input device and the communication terminal is maintained. Thus, the communication system enables smooth determination of a level with respect to an electric signal from the voice input device and smooth transmission of the electric signal in accordance with a result of the determination.

In Aspect 2 of the present invention, the communication system in accordance with Aspect 1 is configured such that the communication system includes, as the level determination section, a Voice Operated Xmit (VOX) determination section configured to determine whether the electric signal is at a level not less than a predetermined first level threshold, the transmission control section being configured to transmit, to the IP transceiver, the electric signal that is at a level not less than the first level threshold.

In the communication system, no electric signal is transmitted from the voice input device to the communication terminal in a case where the transmission switch is not being pressed. As such, setting the first level threshold to a low value allows even an electric signal indicative of a relatively quiet input voice to be transmitted by the transmission control section. As such, according to the above configuration, the communication system is able to provide operability substantially equal to that of a PTT function in an ordinarily transceiver.

In Aspect 3 of the present invention, the communication system in accordance with Aspect 2 is configured such that the communication system further includes, as the level determination section, an operation sound determination section configured to determine whether the electric signal is at a level (i) less than a predetermined second level threshold, (ii) not less than a predetermined third level threshold which is higher than the second level threshold, or (iii) not less than the second level threshold but less than the third level threshold, the transmission control section being configured to: in a case where the electric signal has a first period, a second period, and a third period in this order, stop transmission of the electric signal until an end of the second period, the first period being a period in which the electric signal is at a level less than the second level threshold, the second period being a period in which the electric signal is at a level not less than the third level threshold, the third period being a period in which the electric signal is at a level not less than the second level threshold but less than the third level threshold; and in a case where the electric signal has the third period, the second period, and the first period in this order, stop transmission of the electric signal after a start of the second period.

According to the above configuration, in a case where there are the first period, the second period, and the third period in this order or in reverse order, the transmission control section stops transmission of the electric signal during the second period. The electric signal during the second period in this case indicates an operation sound resulting from an operation of the transmission switch. Thus, the communication system allows preventing an electric signal indicative of an operation sound, a level of which is relatively high, from being transmitted to an IP transceiver or the like of a communication partner.

In Aspect 4 of the present invention, the communication system in accordance with Aspect 1 is configured such that the communication system further includes, as the level determination section, an operation sound determination section configured to determine whether the electric signal is at a level (i) less than a predetermined second level threshold, (ii) not less than a predetermined third level threshold which is higher than the second level threshold, or (iii) not less than the second level threshold but less than the third level threshold, the transmission control section being configured to: in a case where the electric signal has a first period, a second period, and a third period in this order, starts transmission of the electric signal to the IP transceiver in response to an end of the second period, the first period being a period in which the electric signal is at a level less than the second level threshold, the second period being a period in which the electric signal is at a level not less than the third level threshold, the third period being a period in which the electric signal is at a level not less than the second level threshold but less than the third level threshold; and in a case where the electric signal has the third period, the second period, and the first period in this order, end transmission of the electric signal to the IP transceiver in response to a start of the second period.

According to the above configuration, the transmission control section starts transmission of an electric signal after an end of an operation sound that is produced when the transmission switch is pressed. Further, the transmission control section ends transmission of an electric signal before a start of an operation sound that is produced when pressing of the transmission switch is released. Thus, the communication system makes it possible to carry out transmission control, without separately providing a VOX function, by detection of a start and an end of transmission and to prevent an electric signal indicative of an operation sound from being transmitted to an IP transceiver or the like of a communication partner.

In Aspect 5 of the present invention, the communication system in accordance with any one of Aspects 1 through 4 is configured such that: the communication terminal further includes a band-pass filter configured to allow only an electric signal included in said electric signal and having a frequency within a predetermined range to pass through; the level determination section is configured to determine a level of the electric signal that has passed through the band-pass filter; and the transmission control section is configured to transmit, to the IP transceiver, the electric signal that has not passed through the band-pass filter.

According to the above configuration, the communication system enables: reduction of an effect of noise in a case where the level determination section determines a level of an electric signal; and reduction of degradation of an electric signal transmitted by the transmission control section to an IP transceiver or the like of a communication partner.

A voice input device in accordance with Aspect 6 of the present invention is a voice input device included in the communication system in accordance with any one of Aspects 1 through 5.

According to the above configuration, the same effect as in Aspect 1 is produced by the voice input device in a case where the voice input device is combined with the communication terminal in accordance with Aspect 7.

A communication terminal in accordance with Aspect 7 of the present invention is a communication terminal included in the communication system in accordance with any one of Aspects 1 through 5.

According to the above configuration, the same effect as in Aspect 1 is produced by the communication terminal in a case where the communication terminal is combined with the voice input device in accordance with Aspect 6.

A program in accordance with Aspect 8 of the present invention is a program for causing a computer to function as the communication terminal in accordance with Aspect 7, the program causing the computer to function as the level determination section and the transmission control section.

According to the above configuration, the same effect as in Aspect 7 is produced.

The present invention is not limited to the embodiments, but can be altered by a skilled person in the art within the scope of the claims. The present invention also encompasses, in its technical scope, any embodiment derived by combining technical means disclosed in differing embodiments.

Reference Signs List 1, 2: communication system
10: microphone (voice input device)
12: PTT switch (transmission switch)
13: connection state maintenance circuit
20A: communication terminal
22: connection detection section
231: band-pass filter
232: VOX determination section (level determination section)
233: operation sound determination section (level determination section)
234: transmission control section
30: phone connector

The invention claimed is:

1. A communication system, comprising:
a communication terminal capable of communicating with an Internet Protocol (IP) transceiver; and
a voice input device for inputting a voice into the communication terminal,
the communication terminal and the voice input device being connected to each other via a phone connector, the IP transceiver being configured to carry out communication over a mobile phone network,
the voice input device including:
a microphone element configured to convert the voice into an electric signal;
a transmission switch configured to switch between transmitting or not transmitting the electric signal from the voice input device to the communication terminal; and
a connection state maintenance circuit for causing the communication terminal to recognize, regardless of a state of the transmission switch, that a connection between the voice input device and the communication terminal is maintained, and
the communication terminal including:
a connection detection section configured to detect a state in which the voice input device and the communication terminal are connected to each other;
a level determination section configured to determine a level of the electric signal in a state in which the voice input device is connected to the communication terminal; and
a transmission control section configured to control, in accordance with a result of determination by the level determination section, transmission of the electric signal to the IP transceiver,
wherein the level determination section is a Voice Operated Xmit (VOX), the level determination section is configured to determine whether the electric signal is at a level not less than a predetermined first level threshold and the transmission control section is configured to transmit, to the IP transceiver, the electric signal that is at a level not less than the first level threshold,
wherein the level determination section is an operation sound determination section configured to determine whether the electric signal is at a level (i) less than a predetermined second level threshold, (ii) not less than a predetermined third level threshold which is higher than the second level threshold, or (iii) not less than the second level threshold but less than the third level threshold, and
wherein the transmission control section is configured to:
in a case where the electric signal has a first period, a second period, and a third period in this order, stop transmission of the electric signal until an end of the second period, the first period being a period in which the electric signal is at a level less than the second level threshold, the second period being a period in which the electric signal is at a level not less than the third level threshold, the third period being a period in which the electric signal is at a level not less than the second level threshold but less than the third level threshold; and in a case where the electric signal has the third period, the second period, and the first period in this order, stop transmission of the electric signal after a start of the second period.

2. The communication system as set forth in claim 1, wherein:

the communication terminal further includes a band-pass filter configured to allow only an electric signal included in said electric signal and having a frequency within a predetermined range to pass through;

the level determination section is configured to determine a level of the electric signal that has passed through the band-pass filter; and the transmission control section is configured to transmit, to the IP transceiver, the electric signal that has not passed through the band-pass filter.

3. A voice input device included in a communication system recited in claim 1.

4. A communication terminal included in a communication system recited claim 1.

5. A computer-readable non-transitory storage medium storing therein a program for causing a computer to function as a communication terminal recited in claim 4, the program causing the computer to function as the level determination section and the transmission control section.

6. A communication system, comprising:

a communication terminal capable of communicating with an Internet Protocol (IP) transceiver; and a voice input device for inputting a voice into the communication terminal, the communication terminal and the voice input device being connected to each other via a phone connector, the IP transceiver being configured to carry out communication over a mobile phone network, the voice input device including:

a microphone element configured to convert the voice into an electric signal;

a transmission switch configured to switch between transmitting or not transmitting the electric signal from the voice input device to the communication terminal; and a connection state maintenance circuit for causing the communication terminal to recognize, regardless of a state of the transmission switch, that a connection between the voice input device and the communication terminal is maintained; and the communication terminal including:

a connection detection section configured to detect a state in which the voice input device and the communication terminal are connected to each other;

a level determination section configured to determine a level of the electric signal in a state in which the voice input device is connected to the communication terminal; and a transmission control section configured to control, in accordance with a result of determination by the level determination section, transmission of the electric signal to the IP transceiver, wherein the level determination section is an operation sound determination section configured to determine whether the electric signal is at a level (i) less than a predetermined second level threshold, (ii) not less than a predetermined third level threshold which is higher than the second level threshold, or (iii) not less than the second level threshold but less than the third level threshold, and the transmission control section being configured to:

in a case where the electric signal has a first period, a second period, and a third period in this order, start transmission of the electric signal to the IP transceiver in response to an end of the second period, the first period being a period in which the electric signal is at a level less than the second level threshold, the second period being a period in which the electric signal is at a level not less than the third level threshold, the third period being a period in which the electric signal is at a level not less than the second level threshold but less than the third level threshold; and in a case where the electric signal has the third period, the second period, and the first period in this order, end transmission of the electric signal to the IP transceiver in response to a start of the second period.

7. The communication system as set forth in claim 6, wherein:

the communication terminal further includes a band-pass filter configured to allow only an electric signal included in said electric signal and having a frequency within a predetermined range to pass through;

the level determination section is configured to determine a level of the electric signal that has passed through the band-pass filter; and the transmission control section is configured to transmit, to the IP transceiver, the electric signal that has not passed through the band-pass filter.

8. A voice input device included in a communication system recited in claim 7.

9. A communication terminal included in a communication system recited in claim 7.

10. A computer-readable non-transitory storage medium storing therein a program for causing a computer to function as a communication terminal recited in claim 9, the program causing the computer to function as the level determination section and the transmission control section.

11. A voice input device included in a communication system recited in claim 6.

12. A communication terminal included in a communication system recited in claim 6.

13. A computer-readable non-transitory storage medium storing therein a program for causing a computer to function as a communication terminal recited in claim 12, the program causing the computer to function as the level determination section and the transmission control section.

* * * * *